(12) United States Patent
Shudark et al.

(10) Patent No.: US 10,419,832 B2
(45) Date of Patent: Sep. 17, 2019

(54) DETECTING AN ERROR CONDITION BY MONITORING A RESOURCE FLOW AT A PREMISES

(71) Applicant: LANDIS+GYR INNOVATIONS, INC., Alpharetta, GA (US)

(72) Inventors: Jeffrey B. Shudark, Cumming, GA (US); James Davis, Woodstock, GA (US)

(73) Assignee: Landis+Gyr Innovations, Inc., Aplharetta, GA (US)

( * ) Notice: Subject to any disclaimer, the term of this patent is extended or adjusted under 35 U.S.C. 154(b) by 276 days.

(21) Appl. No.: 15/385,285

(22) Filed: Dec. 20, 2016

(65) Prior Publication Data

US 2017/0180832 A1    Jun. 22, 2017

Related U.S. Application Data

(60) Provisional application No. 62/270,282, filed on Dec. 21, 2015.

(51) Int. Cl.
*H04Q 9/14* (2006.01)
*G08C 19/18* (2006.01)
(Continued)

(52) U.S. Cl.
CPC .............. *H04Q 9/14* (2013.01); *G01D 4/00* (2013.01); *G06Q 50/06* (2013.01); *G08C 19/18* (2013.01);
(Continued)

(58) Field of Classification Search
CPC ..... H04W 4/70; G08C 19/18; G08C 2200/00; H04Q 9/14; H04Q 2209/10;
(Continued)

(56) References Cited

U.S. PATENT DOCUMENTS 4,437,336 A    3/1984  Abe
5,086,806 A    2/1992  Engler et al.
(Continued)

FOREIGN PATENT DOCUMENTS

| AT | 509742 | | 11/2011 |
|---|---|---|---|
| CN | 104635004 A | * | 5/2015 |
| WO | 2017112683 | | 6/2017 |

OTHER PUBLICATIONS

International Application No. PCT/US2016/067810, International Search Report and Written Opinion dated Apr. 5, 2017, 10 pages.

*Primary Examiner* — Mischita L Henson
(74) *Attorney, Agent, or Firm* — Kilpatrick Townsend & Stockton LLP

(57) ABSTRACT

A communication module uses information received from a metrology module within the same network device and information about the properties of the specific metrology module, such as supply capacity and pulse volume, to determine when an error condition exits. The communication module accumulates pulses during an accumulation interval and compares the number of pulses accumulated during the accumulation interval to a threshold number of pulses to determine whether an error condition exists. If there is an error condition, then the communication module generates an alert and may transmit the alert without waiting for a scheduled communication.

18 Claims, 4 Drawing Sheets

(51) Int. Cl.
  *G01D 4/00*    (2006.01)
  *G06Q 50/06*   (2012.01)
  *H04W 4/70*        (2018.01)
  *G01M 3/26*        (2006.01)
  *G01F 15/075*      (2006.01)

(52) U.S. Cl.
  CPC ........... *G01F 15/0755* (2013.01); *G01M 3/26* (2013.01); *G08C 2200/00* (2013.01); *H04Q 2209/10* (2013.01); *H04Q 2209/823* (2013.01); *H04Q 2209/883* (2013.01); *H04W 4/70* (2018.02); *Y02B 90/246* (2013.01); *Y04S 20/36* (2013.01); *Y04S 20/42* (2013.01)

(58) Field of Classification Search
  CPC ....... H04Q 2209/823; H04Q 2209/883; Y02B 90/246; Y04S 20/36; Y04S 20/42; G01D 4/00; G01M 3/26; G01F 15/0755; G06Q 50/06
  See application file for complete search history.

(56) References Cited

U.S. PATENT DOCUMENTS

| | | | |
|---|---|---|---|
| 6,323,774 B1 | 11/2001 | Mitchell | |
| 9,335,297 B1* | 5/2016 | Cummins | G01N 29/14 |
| 2005/0104744 A1* | 5/2005 | Patterson | G01D 4/006 |
| | | | 340/870.02 |

* cited by examiner

DETECTING AN ERROR CONDITION BY MONITORING A RESOURCE FLOW AT A PREMISES

This application claims priority to U.S. Provisional Patent Application No. 62/270,282 filed Dec. 21, 2015 entitled "Monitoring a Flow Rate at a Premises" which is incorporated herein in its entirety by reference.

TECHNICAL FIELD

The present invention is generally directed to detecting an error condition at a premises by monitoring a flow of a resource provided to the premises and considering meter-specific characteristics.

BACKGROUND

A meter may measure the consumption of a resource, such as gas, electricity, or water at a premises. The meter may be included in a node on a network where the node includes both the meter and a communication module. The node communicates consumption information to a central system or head end system via the communication module. The central system may analyze the consumption information to manage the resource at each of the premises and to manage other aspects of the system.

The central system may identify a failure at the premises, such as an open gas pipe, by analyzing consumption information and determining that there is a gross amount of flow at the premises, i.e., an amount of flow that is significantly greater than normal. However, the central system typically uses the same set of rules for each device type. It does not consider the characteristics of the specific device or apply different rules based on the characteristics of the meter, such as capacity of the meter, or consider historical consumption information. Since meters serving a commercial or industrial premises may report on a different schedule and may have a different capacity than meters serving residential premises, it would be more useful to consider individual characteristics of the meter and the premises. Thus, it would be helpful if a failure or other error condition could be identified with more accuracy and with less delay.

SUMMARY

Systems and methods of the present invention provide more timely and accurate detection of an error condition at a premises. A device located at the premises may include a communication module and a metrology module. The device may be connected to a network along with a number of other devices and may communicate with a central system via the network. The device may be configured to collect information about resource usage at the premises over a time interval and to communicate that information to the central system according to a schedule under normal conditions.

The communication module uses information received from the metrology module and information about the properties of the specific metrology module to determine when an error condition exits. In one example, the communication module determines a threshold number of pulses for an accumulation interval that indicates an error condition. The threshold number of pulses is based on the properties or characteristics of the specific metrology module, such as supply capacity and the pulse volume value, the duration of the accumulation interval, and the type of error condition to be detected. The communication module accumulates pulses during the accumulation interval. After the accumulation interval expires, the communication module compares the number of pulses accumulated during the accumulation interval to the threshold number of pulses to determine whether an error condition exists. If there is an error condition, then the communication module generates an alert and sends it to the central system. The communication module may send the alert as soon as it is generated. It may not wait for the next scheduled communication of consumption information. Alternatively, the alert may not be sent as soon as it is generated, but at another time.

These and other features, aspects, and advantages of the present disclosure are better understood when the following Detailed Description is read with reference to the accompanying drawings.

DETAILED DESCRIPTION

A communication module uses information received from an associated metrology module and information about the properties of the specific metrology module to determine when an error condition exits. The properties or characteristics of the specific metrology module are used to determine a threshold number of pulses. Properties, such as supply capacity and pulse volume value, as well as a type of error condition may be considered when determining the threshold number of pulses. The communication module accumulates pulses during an accumulation interval. After the accumulation interval expires, the communication module compares the number of pulses accumulated during the accumulation interval to the threshold number of pulses to determine whether an error condition exists. If there is an error condition, then the communication module generates an alert and sends it to the central system.

Exemplary Operating Environment

Figure 1:
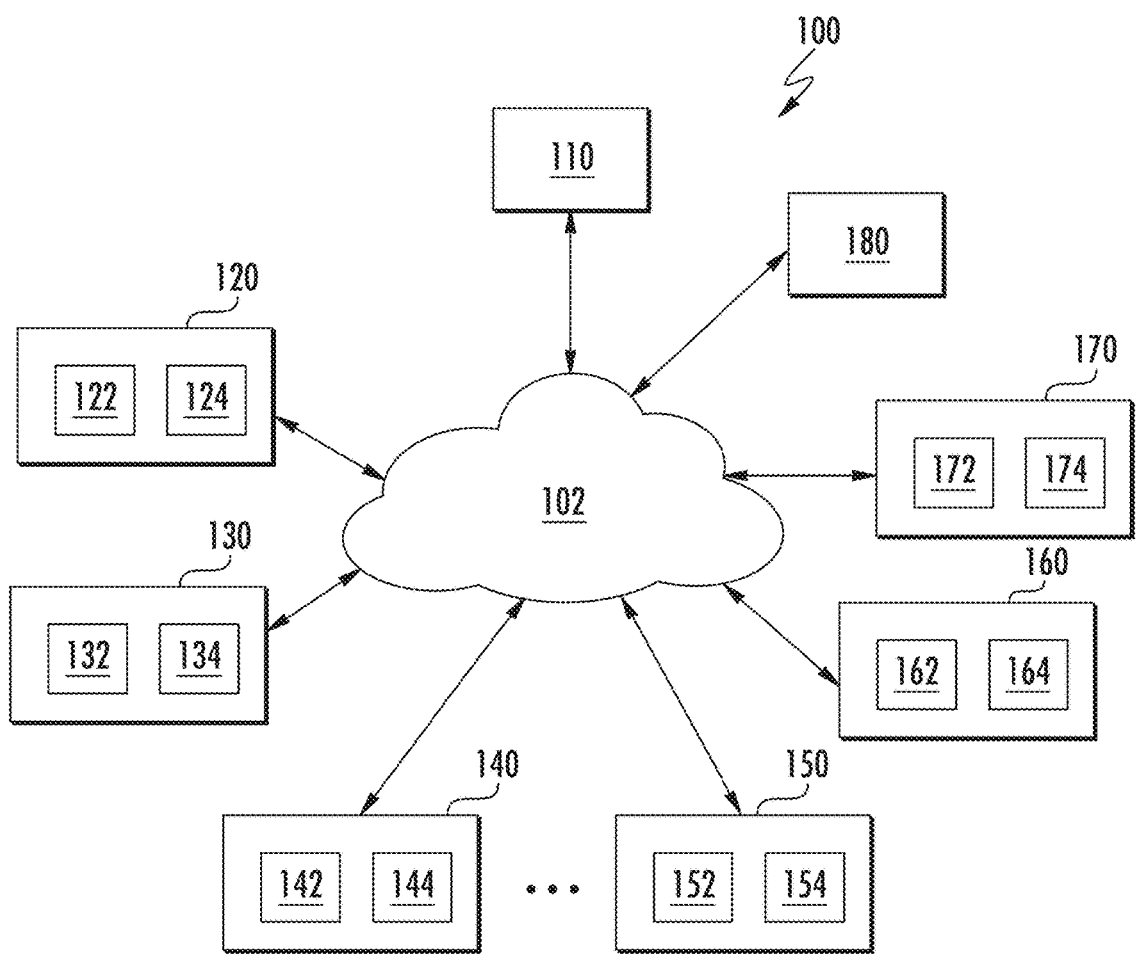
FIG. 1 is a block diagram illustrating an exemplary network.

The present invention may operate within a node of a network, where the node includes a communication module and a metrology module. FIG. 1 illustrates an exemplary network 100. The network includes nodes 120, 130, 140, 150, 160, 170 located at different premises and a central system 110. The network may include other network devices 180 as well. The nodes and the central system communicate via a network 100, such as a wireless mesh network, PLC, cellular network, or other suitable network or combination of networks.

At least some of the nodes include a communication module and a metrology module. For example, node 120 includes a communication module 124 and a metrology module 122. Nodes 130, 140, 150, 160, 170 respectively include communication modules 134, 144, 154, 164, 174 and metrology modules 132, 142, 152, 162, 172. The metrology modules in nodes 120, 130, 140, 150, 160, 170 may have different properties or characteristics. For example, the supply capacity of the metrology modules may differ, the way the metrology module measures resource consumption may differ, or the way the metrology module communicates with the communication module may differ. In addition, the resource consumption for the premises associated with the nodes may have different characteristics, such as the amount of consumption or the rate of consumption. The communication modules in nodes 120, 130, 140, 150, 160, 170 may also have different properties or characteristics.

In some systems the nodes 120, 130, 140, 150, 160, 170 collect resource consumption information over a predefined interval, referred to herein as a read interval, and send the collected information to the central system 110 on a schedule. For example, a node associated with a commercial or industrial premises may collect consumption information over an hour (i.e., the read interval is one hour) and send the information to the central system during the next hour or next read interval. A node associated with a residential premises may collect consumption information over a 24 hour period (i.e., the read interval is 24 hours) and send the information to the central system during the next 24 hour period or next read interval.

In these systems, it may be difficult to timely identify an error condition at the premises, such as an open flow, based on the consumption information received at the central system since the central system may not receive the information until well after the error condition occurs. In addition, the central system may have only basic rules for analyzing consumption information to detect an error condition. For example, the central system may use the same set of rules to analyze all information received from all meters of a certain type without considering the capacity of each individual meter.

Some nodes may be low powered endpoints (LPEs). A low powered endpoint has a limited power source, such as a battery, vampire tapped power, or harvested power. A LPE may enter a low power mode to conserve power. The LPE may turn off one or more components or place them in a reduced power state while in low power mode. For example, the LPE may use a high power, high accuracy TCXO in regular power mode, but power down the TCXO in low power mode and use a lower power, lower accuracy oscillator. The LPE may wake up and enter a regular power mode periodically to synchronize with the network and may communicate on the network while in regular power mode.

The communication module may monitor the operation of the metrology module to detect an error condition. Using the communication module in this manner results in a more timely and accurate detection of the error condition. The communication module may be configured to monitor the flow rate and to detect significant variations in the flow rate. When there is a significant variation, the communication module may alert the central system. The alert may be transmitted when the variation in flow rate is detected instead of waiting until the next normally scheduled communication. The communication module may also provide alerts to other systems or users.

Exemplary Node

Figure 2:
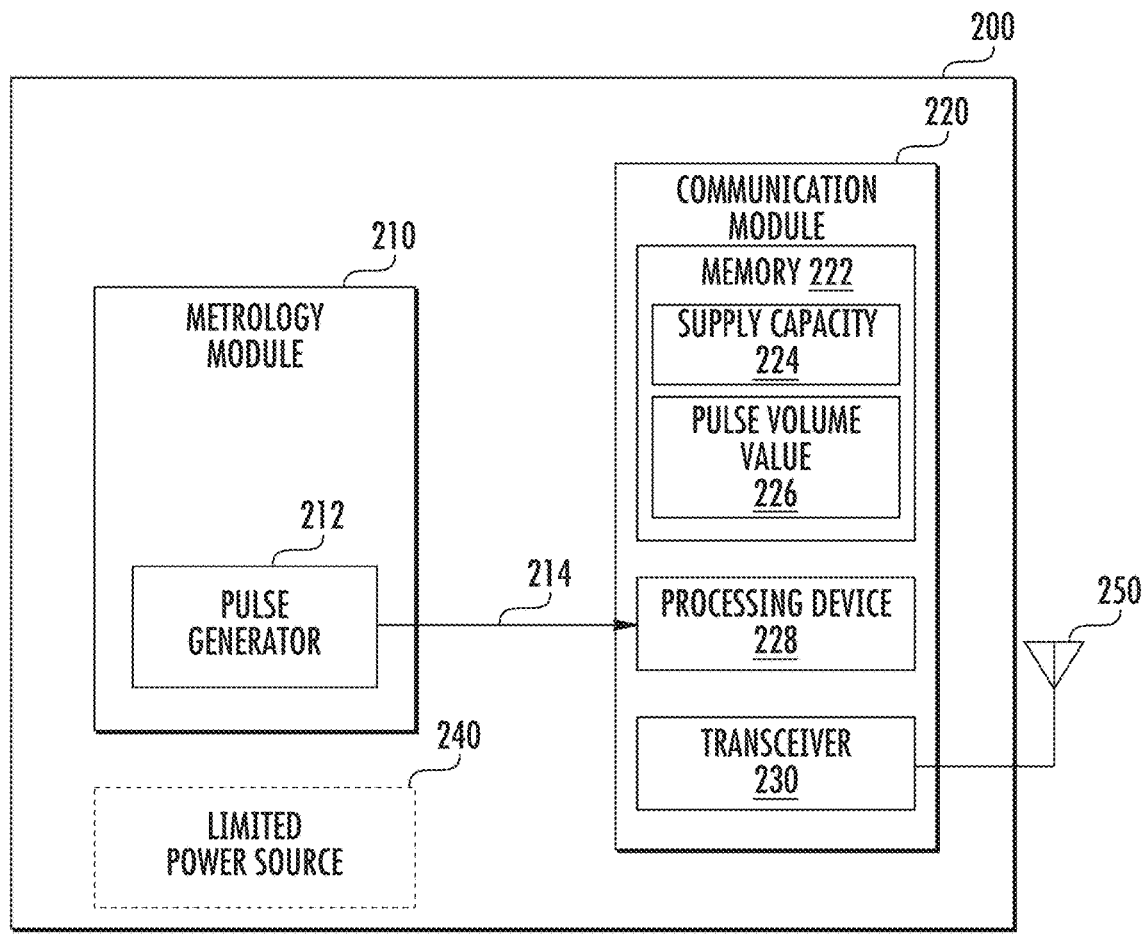
FIG. 2 is a block diagram illustrating an exemplary node, including a communication module and a metrology module.

FIG. 2 illustrates an exemplary node 200. The node includes a metrology module 210 and a communication module 220. The metrology module may include a pulse generator 212. In one example, the metrology module includes a rotating dial pointer with a magnet. As the pointer rotates, the magnet is moved past a switch and the switch changes state generating a pulse. The pulse is communicated to the communication module 220 via connection 214. Other metrology modules may use other ways of generating a pulse or use other ways of communicating consumption data to the communication module.

The communication module 220 includes processing device 228, transceiver 230, and memory 222. The processing device 228 may include an accumulator for counting the number of pulses received from the pulse generator and storing the count. The transceiver 230 may be connected to antenna 250 and the transceiver may be used to send and receive communications on the network. The memory 222 stores information for the specific meter or metrology module in the node, such as the supply capacity 222 and the pulse volume value 226. The pulse volume value indicates the volumetric equivalent of a pulse for the metrology module 210. Other information and settings may also be stored in the memory. The memory may be a computer-readable medium and in addition to storing information and settings may store computer executable instructions which when executed may configure the communication module to perform the operations described herein.

Other components, connections between components, and arrangements of components other than those shown in FIG. 2 are possible. For example, the memory and processing device may be included in a single component, such as a microcontroller. If the endpoint is a LPE, then it may include a limited power source 240 and well as a high accuracy oscillator (not shown) and a lower accuracy oscillator (not shown).

Exemplary Method of Operation

Figure 3:
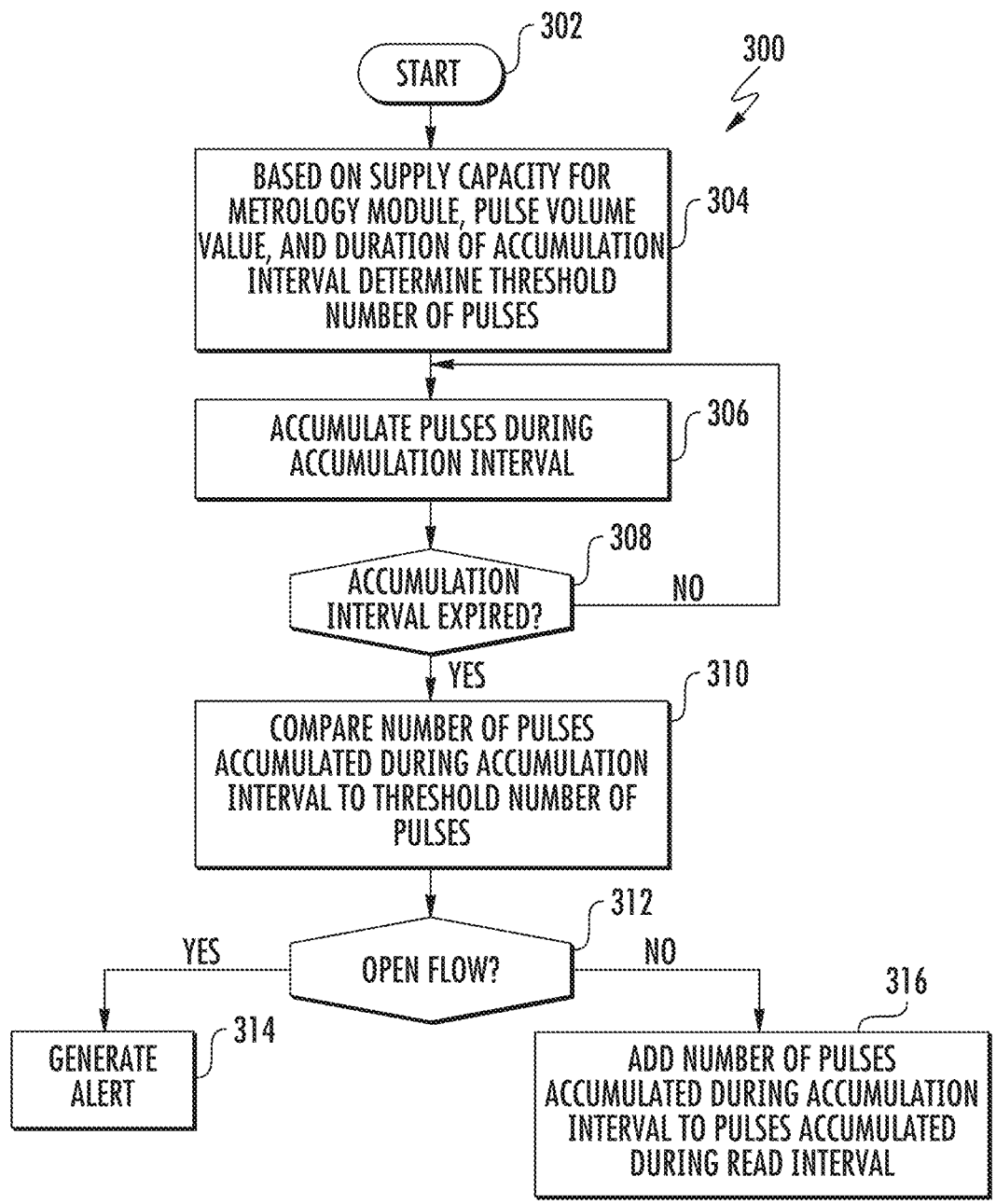
FIG. 3 is a flow diagram illustrating an exemplary method of the communication module.

FIG. 3 illustrates an exemplary method 300 performed by the communication module. The method starts at 302 and proceeds to 304. In 304, the communication module determines a threshold number of pulses for an accumulation interval that indicates an error condition. The threshold number of pulses is based on the characteristics of the specific metrology module, such as supply capacity and the pulse volume value, the duration of the accumulation interval, and the type of error condition to be detected. FIG. 3 represents an example where the error condition is an open flow condition, such as a broken pipe.

The method proceeds from 304 to 306 where the communication module accumulates pulses during an accumulation interval. In 308, the communication module determines whether the accumulation interval has expired. If the accumulation interval has expired, then the method proceeds via the Yes branch to 310. If the accumulation interval has not expired, then the method returns to 306 via the No branch and continues to accumulate pulses.

In 310, the communication module compares the number of pulses accumulated during the accumulation interval to the threshold number of pulses. In one example, the number of pulses accumulated during the accumulation interval is determined by reading an accumulation register.

The communication module determines whether the number of pulses accumulated during the accumulation interval indicates an open flow condition at 312. In one example, the communication module determines that there is an open flow condition if the number of pulses accumulated during the accumulation interval meets or exceeds the threshold number of pulses. If there is an open flow condition, then the method proceeds to 314 via the Yes branch and an alert is generated. If no open flow condition is detected, then the method proceeds to 316 via the No branch and the pulses accumulated during the accumulation interval are added to pulses accumulated during the read interval. The method may repeat so that the communication module accumulates pulses for multiple accumulation periods.

The duration of the read interval is longer than the duration of the accumulation interval. Both of the intervals may be configurable. In one example, the duration of the read interval is 24 hours and the duration of the accumulation interval is ten seconds. In this example, the number of pulses accumulated during all of the accumulation intervals in a 24 hour period equals the number of pulses accumulated during the 24 hour read interval. The communication module uses the number of pulses accumulated during the 24 hour read interval to send consumption information to the central system.

Other examples may use different configurations for the accumulation interval and the read interval. For example, the duration of the accumulation interval may be one minute, and it may occur every other minute and the read interval may be 24 hours. In this example, the number of pulses accumulated during all the accumulation intervals in a 24 hour period is less than the number of pulses for the 24 hour read interval.

After the alert is generated at 314, the communication module may send a message indicating the presence of the error condition to the central system or may further process the alert prior to sending a message to the central system. In one example, the communication module determines whether an alert was generated in one or more preceding accumulation intervals. If an alert was generated in one or more preceding accumulation intervals, then the communication module may send the message. If an alert was not generated in one or more of the preceding accumulation intervals, then the communication module may wait to see whether an alert is generated in the next accumulation interval. Considering the number of pulses received over multiple accumulation intervals may increase the reliability of the message since it may avoid sending a message based on a false positive.

Although FIG. 3 illustrates the detection of an open flow condition, other methods may detect other conditions, such as significant variations in flow rate from historical or expected flow rates, or a flow rate in excess of the meter's rated capacity. Different conditions may use different threshold numbers of pulses and the detection of an error condition may be based on the number of pulses being above, below, or equal to the threshold number of pulses. For example, if the number of accumulated pulses is significantly lower than expected, an under flow condition may be identified. The number of pulses accumulated during the accumulation interval may indicate a problem at the premises or a certain pattern of pulses over multiple accumulation intervals may indicate an error or other potential issues at the premises.

The central system may provide the information for the specific meter, such as the supply capacity and the pulse volume value, as well as any other information needed to detect the error condition to the communications module via a configuration message. Alternatively, the information may be provided upon installation of the node at the premises.

If the communication module is a LPE, then in one example, the processor in the communication module wakes up to receive the pulses from the metrology module. In this example, the processor may wake up for only a short period of time, just long enough to count the pulse. In another example, the processor may not need to wake up for each pulse.

Figure 4:
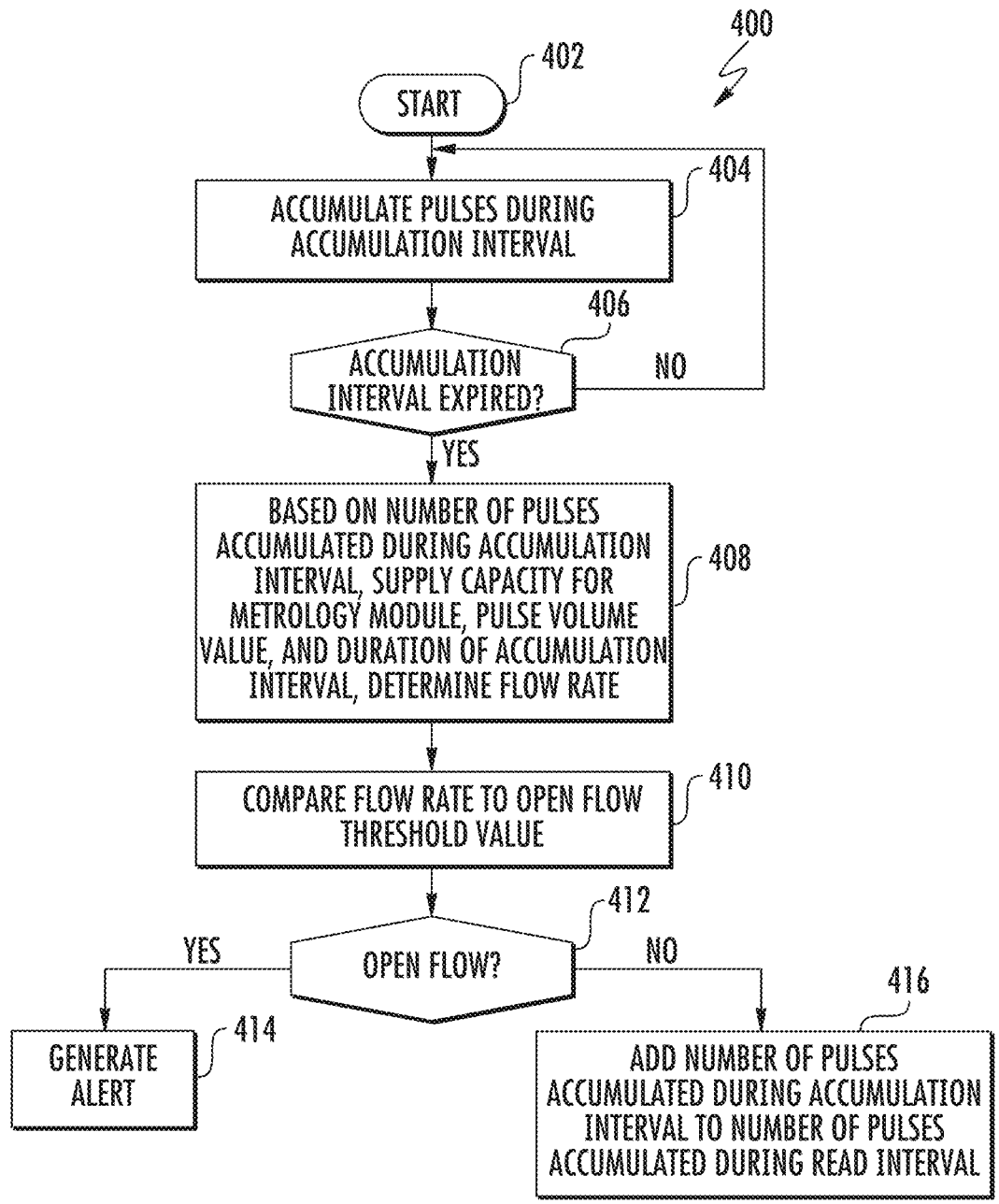
FIG. 4 is a flow diagram illustrating another exemplary method of the communication module.

Alternative methods for detecting an error condition are possible. FIG. 4 illustrates another exemplary method 400 performed by the communication module. The method starts at 402 and proceeds to 404. In 404, the communication module accumulates pulses during an accumulation interval.

In 406, the communication module determines whether the accumulation interval has expired. If the accumulation interval has expired, then the method proceeds via the Yes branch to 408. If the accumulation interval has not expired, then the method returns to 404 via the No branch and continues to accumulate pulses.

In 408, the communication module determines a flow rate using the number of pulses accumulated during the accumulation interval, the duration of the accumulation interval, and information specific to the metrology module. The information specific to the metrology module may include the supply capacity for the metrology module and the pulse volume value. The communication module compares the flow rate calculated in 408 with an open flow threshold value in 410. The communication module determines whether the flow rate calculated in 408 indicates an open flow condition at 412. In one example, the communication module determines that there is an open flow condition if the calculated flow rate meets or exceeds the open flow threshold value. If there is an open flow condition, then the method proceeds to 414 via the Yes branch and an alert is generated. If no open flow condition is detected, then the method proceeds to 416 via the No branch and the pulses accumulated during the accumulation interval are added to pulses accumulated during the read interval.

The foregoing is provided for purposes of illustrating, describing, and explaining aspects of the present invention and is not intended to be exhaustive or to limit the invention to the precise forms disclosed. Further modifications and adaptation of these embodiments will be apparent to those skilled in the art and may be made without departing from the scope and spirit of the invention. Different arrangements of the components described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent.

What is claimed is:

1. A network device, comprising:
   a communication module for communicating on a wireless network, the communications module including a wireless transceiver and a processing device; and
   a metrology module for measuring a resource provided to a premises associated with the device, wherein the metrology module includes a pulse generator that generates pulses as the resource is provided to the premises and sends the pulses to the processing device,
   wherein the communication module is configured to:
      maintain a supply capacity value for the metrology module and a pulse volume value for pulses received from the pulse generator of the metrology module;
      accumulate pulses received from the pulse generator during an accumulation interval;
      after the accumulation interval has expired, compare a number of pulses accumulated during the accumulation interval to a threshold number of pulses, wherein the threshold number of pulses is based on the supply capacity value for the metrology module, the pulse volume value for the metrology module, an error condition, and a duration of the accumulation interval, wherein the duration of the accumulation interval is less than a duration of a read interval, and a number of pulses accumulated during the read interval determines resource consumption;

when the number of pulses accumulated during the accumulation interval meets or exceeds the threshold number of pulses, generate an alert indicating the error condition; and send a message to a central system via the network indicating the error condition at the premises in response to the generation of the alert.

2. The network device of claim 1, wherein the communication module is further configured to:

when the number of pulses accumulated during the accumulation interval does not meet or exceed the threshold number of pulses, add the number of pulses accumulated during the accumulation interval to the number of pulses accumulated during the read interval; and when the read interval expires, send a consumption message to the central system via the network where consumption information in the consumption message is based on the number of pulses accumulated during the read interval.

3. The network device of claim 1, further comprising:

a limited power source, wherein the communication module is further configured to exit a low power mode and enter a regular power mode prior to sending the message to the central system indicating the error condition at the premises.

4. The network device of claim 3, further comprising:

a first oscillator and a second oscillator, wherein the first oscillator requires more power than the second oscillator, wherein the communication module is further configured to use the first oscillator during the regular power mode and use the second oscillator during the low power mode.

5. The network device of claim 1, wherein the communication module is configured to compare the number of pulses accumulated during the accumulation interval to a number of pulses accumulated during a prior accumulation interval prior to sending the message to the central system via the network indicating the error condition at the node.

6. The network device of claim 1, wherein the communication module is further configured to communicate the alert to a second system.

7. A method for detecting an error condition at a premises, comprising:

maintaining a supply capacity value for a metrology module and a pulse volume value for pulses received from the metrology module, wherein the metrology module measures a resource provided to the premises and generates pulses as the resource is provided to the premises;

determining a threshold number of pulses for the error condition based on the supply capacity value, the pulse volume value, and a duration of an accumulation interval, wherein the duration of the accumulation interval is less than a duration of a read interval, and a number of pulses accumulated during the read interval determines resource consumption;

accumulating pulses received from the metrology module during the accumulation interval;

after the accumulation interval expires, comparing a number of pulses accumulated during the accumulation interval to the threshold number of pulses;

when the number of pulses accumulated during the accumulation interval meets or exceeds the threshold number of pulses, generating an alert for the error condition; and in response to the alert, initiating a communication with a central system and sending a message to the central system indicating the error condition at the premises.

8. The method of claim 7, further comprising:

comparing the number of pulses accumulated during the accumulation interval to a number of pulses accumulated during a prior accumulation interval prior to initiating the communication with the central system.

9. The method of claim 7, further comprising:

comparing the number of pulses accumulated during the accumulation interval and a number of pulses accumulated during a prior accumulation interval to an error pattern prior to initiating the communication with the central system.

10. The method of claim 7, further comprising:

when the number of pulses accumulated during the accumulation interval does not meet or exceed the threshold number of pulses, adding the number of pulses accumulated during the accumulation interval to the number of pulses accumulated during the read interval.

11. The method of claim 10, further comprising:

after the read interval expires, sending a consumption message to the central system that includes consumption information based on the number of pulses accumulated during the read interval, wherein the consumption message is sent based on a schedule.

12. The method of claim 7, wherein the error condition is an open flow condition or corresponds to a flow rate above the metrology module's rated capacity.

13. A method for detecting an open flow at a premises, comprising:

maintaining a supply capacity value for a metrology module, a pulse volume value for pulses received from the metrology module, and an open flow threshold value, wherein the metrology module measures a resource provided to the premises and generates pulses as the resource is provided to the premises;

accumulating pulses received from the metrology module during an accumulation interval, wherein a duration of the accumulation interval is less than a duration of a read interval, and a number of pulses accumulated during the read interval determines resource consumption;

using a number of the pulses accumulated during the accumulation interval, the supply capacity value, and the pulse volume value to calculate a flow value for the accumulation interval;

comparing the flow value for the accumulation interval to the open flow threshold value;

when the flow value for the accumulation interval meets or exceeds the open flow threshold value, generating an alert; and in response to generating the alert, transmitting the alert to the central system.

14. The method of claim 13, further comprising:

receiving a message from the central system that includes the supply capacity value and the pulse volume value for the metrology module.

15. The method of claim 13, further comprising:

calculating the open flow threshold value using the supply capacity value and the pulse volume value.

16. The method of claim 13, further comprising:

comparing the flow value for the accumulation interval to a flow value for a prior accumulation interval.

17. The method of claim 13, further comprising:
comparing the flow value for the accumulation interval and a flow value for a prior accumulation interval to an error pattern.

18. The method of claim 13, wherein the accumulation interval occurs during a low power mode, further comprising:
exiting the low power mode and entering a regular power mode in response to generating the alert.

* * * * *